Jan. 4, 1944.　　　　F. J. LINGEL　　　　2,338,695
ELECTRICAL TESTING APPARATUS
Filed March 9, 1942
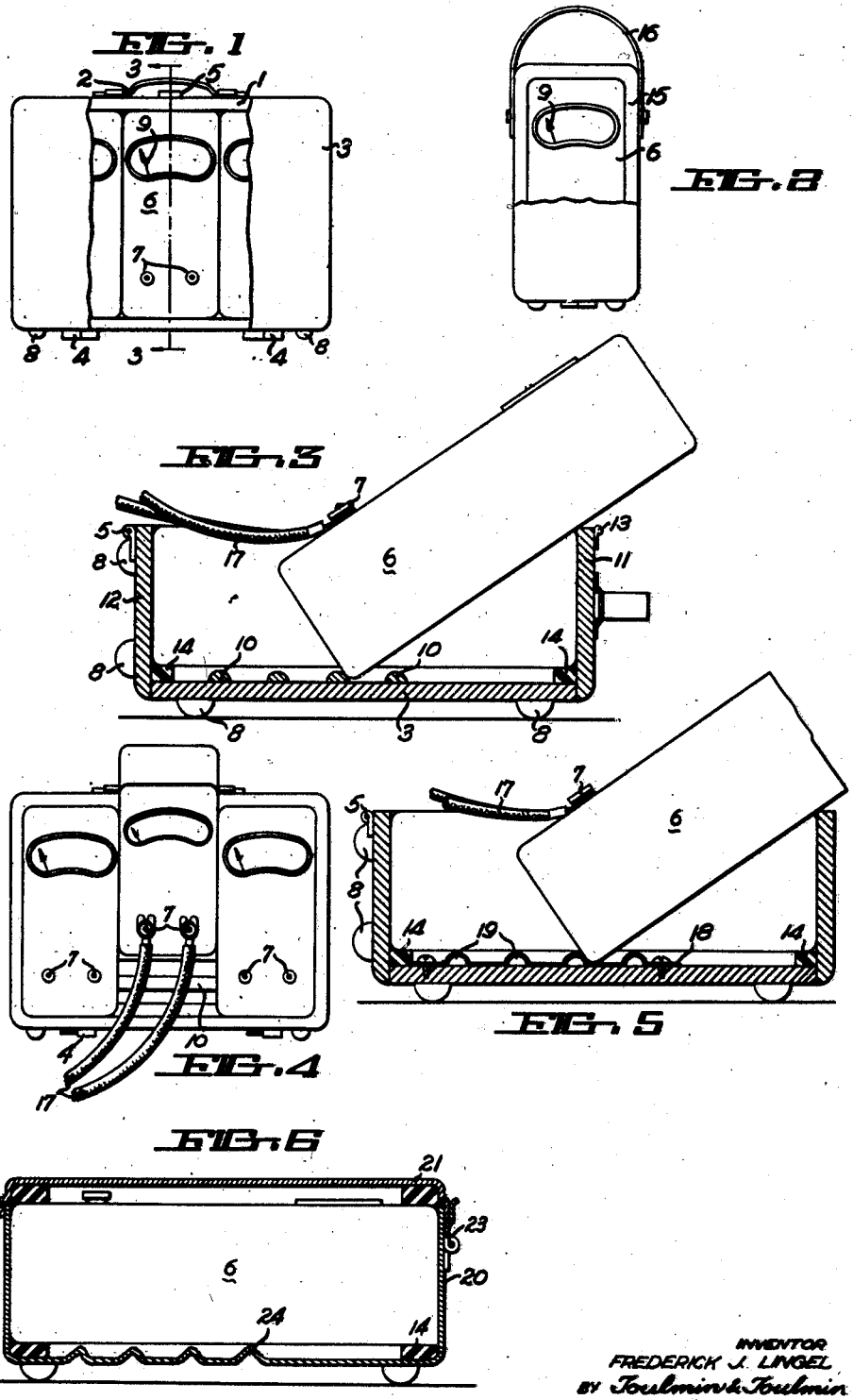
INVENTOR
FREDERICK J. LINGEL
BY Toulmin & Toulmin
ATTORNEYS Patented Jan. 4, 1944

2,338,695

UNITED STATES PATENT OFFICE 2,338,695

ELECTRICAL TESTING APPARATUS

Frederick J. Lingel, Bluffton, Ohio, assignor to Ray L. Triplett, Bluffton, Ohio Application March 9, 1942, Serial No. 433,960

1 Claim. (Cl. 206—16)

The present invention relates to electrical apparatus, and more particularly to portable measuring instruments.

Electrical measuring devices, such as ammeters, voltmeters, etc., and particularly when the instruments are of the open-face type, are usually contained in external wooden cases having a hingable cover and provided with a handle for carrying purposes. There may be one, two or more instruments in a casing nested together for the sake of compactness, and when measurements are to be made the instruments are usually taken out of the casing and arranged flatwise on a bench. This arrangement is not altogether satisfactory because when several instruments are being used simultaneously as when testing a radio set, it is difficult readily and accurately to read the indications of the various instruments on account of the flat position of the scales of the instruments.

In an attempt to alleviate this condition the test man may place the instruments in a vertical position, but often this arrangement is no more satisfactory than when the meters are placed in the horizontal position since the tester may have to stoop to make his readings, and in any case is not certain that he is reading the meters squarely. Various other expedients have been tried to render the observation work of the instrument tester as easy and as accurate as possible, but these expedients have been of a makeshift character and sometimes result in damage to the instrument. For example, one end of the instrument may be raised and placed on a pile of books, or other objects usually found on a test bench, so as to tilt the meter, but it is apparent that the meter usually slides away from its elevated support, particularly if the support is such as to cant the meter at a large angle which may be necessary due to the position of the observer.

The primary object of the present invention is to provide a portable electrical measuring instrument which may be readily adjusted in such a position and will permanently hold that position so as to render the reading operation not only accurate but also as easy as possible.

Another object is to provide structure by which an electrical measuring instrument may be canted or tilted at any desired angle without any danger of the instrument sliding from its support.

A still further object is to provide a structure of the type referred to which can be readily adapted to any number of instruments carried either separately or together within an instrument casing, and in which the structure is of simple design and if necessary may be provided by the user of the instrument or instruments rather than being provided by the manufacturer.

Another object is to provide a tilting structure for one or more electrical measuring instruments which is adapted to any type and shape of instrument, and which may be secured to the instrument casing in such a way as to constitute no obstruction to the ordinary use of the instrument in case the tilting feature is not desired.

These objects are carried out, in brief, by providing within the instrument casing a plurality of projections which may be formed of wooden cleats or metal upset members which extend along the bottom of the casing and are adapted to receive the lowermost corners or edge of the instrument or instruments so that the latter may be tilted against the rear side of the casing and solidly held in that position.

The invention will be better understood when the following specification is perused in connection with the accompanying drawing.

In the drawing:

Figure 1 is a plan view of an instrument casing containing a number of meters, three as illustrated, and improved in accordance with the present invention. The cover of the casing over at least one of the meters has been broken away to expose the interior parts.

Figure 2 is a plan view of a modified form of instrument casing and the contained instrument, particularly as applied to a single-meter unit. A portion of the cover or casing which surrounds the meter in Figure 2 has also been removed.

Figure 3 is a section taken along the line 3—3 in Figure 1, except that the meters are shown in elevation and the middle meter is arranged in a tilted position in order to more clearly illustrate the features of the invention.

Figure 4 is a plan view similar to Figure 1, but showing the middle meter in a tilted position with the farthermost upper edge of the meter at a higher position than the nearer edge.

Figure 5 is a view somewhat similar to Figure 3 except that it shows a modified structure by which one or more of the meters may be held in a tilted position. In Figures 5 and 3 the cover of the instrument casing has been removed in order to simplify the illustrations.

Figure 6 shows still another way in which the cleats or abutments for holding the instrument or instruments in a tilted position may be provided.

Referring to Figure 1, reference numeral 1 designates a rectangular box-like compartment or casing preferably formed of hard wood, and provided with a leather handle 2 in any suitable manner. The casing 1 is closed on all sides except the top. A cover 3 is mounted on hinges 4 and secured in closed position, preferably by a snap lock 5. The casing 1 may be of any suitable size, and as shown in Figure 1 contains three electrical measuring instruments 6 which may be an ammeter, voltmeter, watt meter, phase meter, etc. When it is desired to test the operation of a radio set which necessitates the simultaneous use of several instruments, a casing containing all of the instruments is found to be very convenient since the instruments can be transported as a unit. Connections may be made to the instruments through various terminals, of which the terminals 7 of the middle instrument are shown in the figure. In order that the casing may be set down on the test bench without injury to the hinges 4, rubber studs 8 may be secured to the bottom of the casing, these studs usually projecting just beyond the depth of the hinges.

When making a test, and assuming that the instrument casing has been placed on the test bench, the procedure is usually to open the cover 3 by dropping the cover after opening the latch or lock 5, and then to make electrical connections from the radio set to the various terminals 7, as is well known in the art. However, under these conditions the operator may have to stoop to make the necessary determinations, and even then his eyes may not be at the proper height to read the pointer indications, of which a single pointer 9 has been illustrated. It is more than likely that the observer will read the indications at an angle other than the normal angle and thus may introduce inaccuracies into the measurements. Sometimes the instruments are taken from the case and laid flatwise on the test bench in order to facilitate the reading, but in this case inaccuracies will also be introduced due to the position of the observer in failing to direct his eyes in a normal direction toward each scale face. This is particularly true if a large number of instruments is being read simultaneously and the observer tries to determine the measurements without shifting his position. Makeshift schemes have been introduced, depending on the ingenuity of the test man, to tilt one or more of the instruments in order to obtain a square line of sight but these schemes are obviously of a temporary character and usually unsatisfactory, as can well be appreciated.

In accordance with my invention there is provided a structure by which the instrument not only can be tilted to any desired angle, depending on the position of the observer, but also can effect this position while the instrument remains within its protective casing. As shown in Figure 3, the improved structure may take the form of wooden cleats 10 secured to the bottom of the casing and extending along the entire width thereof. These cleats are parallelly disposed to one another, and are so spaced apart that when the bottom of the instrument rests on the rear wall 11 of the casing the instrument may be tilted or canted at any desired angle, depending on the position of the cleat against which the lower edge of the instrument abuts. Consequently, when the instrument casing is placed on the test bench, ready to make a test, it is only necessary to open the cover 3, as explained above, and then after making suitable electrical connections, to arrange one or more of the meters at the proper tilted angle in order to assure a correct reading.

As shown in Figure 3, the bottom side of the casing 1 may be provided with studs 8 to assure a stable position of the casing on the test bench, also the left-hand wall 12 of the casing 1 may be provided with studs in case it is desired to operate the instruments in a vertical position, as explained in connection with Figure 1. It will be understood that the rear wall 11 of the casing 1, in Figure 3, may be provided at its upper surface with two or more hinges 13, to which is detachably secured the cover 3 (shown in Figure 1), this cover being latched or locked to the wall 12 as indicated at 5. For carrying the instrument within the casing the latter may be provided with one or more pairs of rubber ledges 14 on which the bottom of the instrument rests, and the cover may also be provided with similar ledges or bars which abut the upper surface of the instrument, thus holding the instrument rigidly in position when the casing is closed. The height of the ledges 14 is preferably somewhat greater than the thickness of the cleats 10 so that the bottom of the instrument will clear the cleats.

Among the advantages of the cleat structure, as described above, are its simplicity of construction in that any shape of cleat will serve the purpose of retaining the lower opposite corners or the lower edge of the instrument in position, and in case the casing is made of wood these cleats may be nailed or glued in position. The position of the cleats is such that they do not interfere with the normal inclosing and protecting function of the casing 1, and they are always ready to be used since they form an integral part of the casing. It is no longer necessary for the test man to look over his test bench to find something by which to prop up the instrument or instruments. No amount of jarring will cause the instruments to fall from their tilted position because each instrument is held by the cleat and one wall of the casing, and in addition the sides of the instruments are protected by the end walls of the casing. Each instrument may be individually adjusted to any desired angle of cant as long as the casing does not move about its studs, and in order to increase the stability of the casing the studs may be moved as far as possible to the sides of the casing.

In Figure 2 there is shown a single instrument 6 contained in a wooden casing 15 provided with a leather strap 16. A number of cleats or other form of projection may be positioned along the bottom of the casing 15 under the instrument 6. The purpose of the showing in Figure 2 is to emphasize that the cleats are hidden from view when not in use, and also that the cleats may be employed quite as effectively in the case of a single meter unit as when a number of instruments contained in a single casing is involved.

Figure 4 shows a plan view of the cleats and the universality of tilting adjustment obtained thereby in that in this figure only the middle meter is in a tilted position, leaving the other meters in their horizontal position. In this case only the middle meter is being used for testing purposes, as indicated by the wires 17 which connect with the terminals of the meter.

Figure 5 shows a modification of the cleat structure in that the cleats are formed out of a metal plate 18 screwed or otherwise secured at each end to the bottom of the casing. The projections 19 of the metal strip may be formed by a pressing operation, or in any other suitable manner, and as in the case of Figure 3 the height of the projections is somewhat less than the thickness of the ledge members 14. Instead of having the projections 19 conform to a semi-circular shape, as illustrated, it is obvious that if desired any other configuration may be employed. In fact, tabs could be upset from the metal at such positions as to correspond with the lower corners of the instruments and thus to hold the latter rigidly in any desired tilted position. The plate 18 need not extend over the entire length of the casing but if desired may be constituted of a number of parallelly disposed strips which extend along the width of the casing and at positions which correspond with the outside edges of the instruments.

Figure 6 shows the adaptation of the invention to a casing of the metal type. The casing is designated 20 and may be formed preferably out of non-magnetic metal such as aluminum, brass, etc., or if desired may be molded of resinous material. The cover 21 may be detachably secured, as indicated at 22, to the lower or main casing, and a latch or lock 23 may be employed to secure the cover to the casing. The bottom of the casing 20 is provided with a plurality of parallelly disposed ridges 24, extending upwardly and inwardly as indicated, these ridges being adapted to receive the lower corners of the lower edge of the instrument 6 after the cover 21 has been removed. In case the casing is of metal the projections 24 may be formed inexpensively by a pressing operation, as indicated, and in the case of a molded casing these ridges may be molded in position, as is well understood in the art.

From the foregoing it is evident that I have provided an improved structure by which an electrical measuring instrument may be held rigidly in a tilted position at any desired angle, and in which the tilting structure is of an inexpensive but highly effective design. The arrangement is such that it may be readily applied equally well to wood casings or casings made of sheet metal, or of a molded resinous or plastic material.

It will be understood that I desire to comprehend within my invention such modifications as come within the scope of the claim and the invention.

Having thus fully described my invention, what I claim as new and desire to secure by Letters Patent, is:

In combination, an electrical measuring instrument, a detachable case therefor, and means for holding the instrument in a tilted position within the case in order to facilitate reading the measurement indications, said means comprising projections which extend upwardly from the bottom of the case into the interior of the case and are adapted to receive one of the edges of the instrument, said casing having a side of such height and distance from the bottom of the casing whereby to form a ledge for the support of the bottom of the measuring instrument, and a plurality of resilient spacing members, said members being of a greater height than said projections whereby to support said instrument resiliently above said projections when said instrument is entirely within said casing.

FREDERICK J. LINGEL.